United States Patent [19]
Ho

[11] Patent Number: 5,930,392
[45] Date of Patent: Jul. 27, 1999

[54] CLASSIFICATION TECHNIQUE USING RANDOM DECISION FORESTS

[75] Inventor: Tin Kam Ho, Cedar Grove, N.J.

[73] Assignee: Lucent Technologies Inc., Murray Hill, N.J.

[21] Appl. No.: 08/678,937

[22] Filed: Jul. 12, 1996

[51] Int. Cl.$^6$ .............................. G06K 9/62; G06K 9/68; G06K 9/70

[52] U.S. Cl. .......................... 382/224; 382/226; 382/227

[58] Field of Search .................................. 382/159, 190, 382/224–228

[56] References Cited

U.S. PATENT DOCUMENTS

5,661,820  8/1997  Kegelmyer, Jr. ......................... 382/226

OTHER PUBLICATIONS

S. Shlien, "Multiple Binary Decision Tree Classifiers," *Pattern Recognition*, vol. 23, No. 7, 1990, pp. 757–763.

S. Shlien, "Nonparametric Classification Using Matched Binary Decision Trees," *Pattern Recognition Letters*, Feb. 13, 1992, pp. 83–87.

S. Kwok et al., "Multiple Decision trees," *Uncertainty in Artificial Intelligence*, 4, 1990, pp. 327–335.

L. Bottou et al., "Comparison of Classifier Methods: A Case Study in Handwitten Digit Recognition," *Proceedings of the 12th International Conference on Pattern Recognition*, II, Jerusalem, Israel, Oct. 9–13, 1994, pp. 77–82.

L. Hansen et al., "Neural Network Ensembles," *IEEE Transaction of Pattern Analysis and Machine Intelligence*, vol. 12, No. 10, Oct. 1990, pp. 993–1001.

D. Heath et al., "Induction of Oblique Decision Trees," *Proceedings of the 13th International Joint Conference on Artificial Intelligence*, 2, Chamber, France, Aug. 28–Sep. 3, 1993, pp. 1002–1007.

T. Ho, "Recognition of Handwritten Digits by Combining Independent Learning Vector Quantizations," *Proceedings of the Second International Conference on Document Analysis and Recognition*, Tsukuba Science City, Japan, Oct. 20–22, 1993, pp. 818–821.

M. Jordan et al., "Hierarchical Mixtures of Experts and the EM Algorithm," *A.I. Memo* No. 1440, *C.B.C.L. Memmo* No. 83, MIT Artificial Intelligence Laboratory, Center for Biological and Computational Learning, and Department of Brain and Cognitive Sciences, Aug. 6, 1993.

E. Kleinberg, "Stochastic Discrimination," *Annals of Mathematics and Artificial Intelligence*, 1, 1990, pp. 207–239.

E. Kleinberg et al., "Pattern Recognition by Stochastic Modeling," *Proceedings of the Third International Workshop on Frontiers in Handwriting Recognition*, Buffalo, May 1993, pp. 175–183.

Y. Park, "A Comparison of Neural Net Classifiers and Linear Tree Classifiers: Their Similarities and Differences," *Pattern Recognition*, vol. 27, No. 11, 1994, pp. 1493–1503.

J. Schuermann, "A Multifont Word Recognition System for Postal Address Reading," *IEEE Transactions on Computers*, C–27, No. 8, Aug. 1978, pp. 721–732.

J. Schuermann et al., "A Decision Theoretic Approach to Hierarchical Classifier Design," *Pattern Recognition*, vol. 17, No. 3, 1984, pp. 359–369.

(List continued on next page.)

*Primary Examiner*—Leo H. Boudreau
*Assistant Examiner*—Demitry A. Novik

[57] ABSTRACT

In a decision-forest classifier in accordance with the invention, a decision forest including multiple decision trees is used to classify "seen" training data and "unseen" data. Each individual tree performs an initial classification based on randomly selected subsets of the data. The classification outcomes by the individual trees are combined using a discriminant process in the decision-forest classier to render the ultimate classification decision.

8 Claims, 3 Drawing Sheets

OTHER PUBLICATIONS

I. Sethi et al., "Hierarchical Classifier Design Using Mutual Information," *IEEE Transactions on Pattern Analysis and Machine Intelligence*, PAMI–4, No. 4, Jul. 1982, pp. 441–445.

S. Shlien, Multiple Binary Decision Tree Classifiers, Pattern Recognition, vol. 23, No. 7, 1990, pp. 759–761.

L. Hansen, P. Salomon, Neural Network Ensembles, IEEE Trans on Pattern Analysis and Machine Intelligence, vol. 12, No. 10, Oct. 1990, pp. 993–994.

T. Ho, Recognition of Handwritten Digits by Combining Independent Learning Vector Quantizations, Proc. of the Second International Conf. on Document Analysis and Recognition, Tsukuba Science City, Japan, Oct. 20–22, 1993, pp. 818–819.

5,930,392

CLASSIFICATION TECHNIQUE USING RANDOM DECISION FORESTS

FIELD OF THE INVENTION

The invention relates generally to the automatic interpretation of images and patterns, and more particularly to the classification or recognition of such images and patterns.

BACKGROUND OF THE INVENTION

Use of a decision tree including a multiplicity of nodes to classify data is well-known in the art. Decision trees have been studied extensively in the past two decades and employed in many practical applications. For example, one such application is in the area of image and pattern interpretation involving optical character recognition (OCR). The popular use of decision-tree classifiers stems from that the decision tree idea is intuitively apparent, that training of such classifiers is often straight-forward, and that their execution speed is extremely high.

Techniques for devising decision-tree classifiers are described in such papers as: J. Schuermann et al., "A Decision Theoretic Approach to Hierarchical Classifier Design," *Pattern Recognition*, 17, 3, 1984, pp. 359–369; I. Sethi et al., "Hierarchical Classifier Design Using Mutual Information," *IEEE Transactions on Pattern Analysis and Machine Intelligence*, PAMI-4, Jul. 4, 1982, pp. 441–445.

However, the decision-tree classifiers devised according to the traditional techniques often cannot be expanded in complexity without sacrificing their generalization accuracy. The more complex such classifiers are (i.e., the more tree nodes they have), the more susceptible they are to being over-adapted to, or specialized at, the training data which was initially used to train the classifiers. As such, the generalization accuracy of the more complex classifiers is relatively low as they more likely commit errors in classifying "unseen" data, which may not closely resemble the training data previously "seen" by the classifiers.

Attempts have been made to improve the generalization accuracy of the decision-tree classifiers. One such attempt calls for reducing the size of a fully-grown decision tree adopted by a classifier by pruning back the tree. That is, the input data to the classifier does not go through every level of the tree. Rather, after the input data reaches a preselected level of the tree, the classifier is forced to decide its class or probable classes to make the classifier more generalized. Another attempt involves use of probabilistic techniques whereby the input data descends through multiple branches of the tree with different confidence measures. Although the generalization accuracy on the unseen data improves in the above attempts, the improvement often comes at the expense of the accuracy in classifying the seen training data, which would otherwise be classified with 100% correctness.

Recently, decision-tree classifiers including multiple trees were devised by combining trees which were generated heuristically. The designs of these classifiers rely on an input of an ensemble of features representing the object to be classified. One such multiple-decision-tree classifier is described: S. Shlien, "Multiple Binary Decision Tree Classifiers," *Pattern Recognition*, vol. 23, no. 7, 1990, pp. 757–763. Each tree in this classifier is designed based on a different criterion directed to a measure of information gain from the features. The criteria used in the tree design include Komogorov-Smirnov distance, Shannon entropy measure, and Gini index of diversity. Because of a limited number of such criteria available, the number of trees includable in such a classifier is accordingly limited.

Even though it is required that the complete ensemble of features be input to each tree in the prior-art multiple-decision-tree classifiers, the actual number of features used in the tree is oftentimes a fraction of the total number of features input. An effort to increase the number of trees in a classifier by utilizing as many available features as possible is described in: S. Shlien, "Nonparametric classification using matched binary decision trees," *Pattern Recognition Letters*, Feb. 13, 1992, pp. 83–87. This effort involves a feature selection process at each tree node where a usage measure for each feature is computed, and weighed against the information gain if that feature is examined at the node. Specifically, given a choice of features providing a large information gain, the feature with a low usage measure is selected.

Another multiple-decision-tree classifier is described in: S. Kwok et al., "Multiple Decision trees," *Uncertainty in Artificial Intelligence*, 4, 1990, pp. 327–335. In this classifier, trees are designed based on a modified version of the well-known ID3 algorithm. Pursuant to this modified version, a list of tests, which may be used at a tree node for examining the features, are ranked according to the amount of information gain from using the tests. In order to generate different trees, one selects from the ranked list different subsets of tests to replace the tests adopted by top level nodes of a tree constructed in accordance with the traditional ID3 algorithm.

Although it appears that the above prior-art multiple-decision-tree classifiers deliver better classification accuracy than the single-decision-tree classifiers, the designers of the multiple-tree classifiers all struggled and failed to heuristically generate a large number of trees for the classifiers. In addition, the designs of such classifiers do not guarantee that the performance of the classifiers can always be improved by adding trees thereto.

SUMMARY OF THE INVENTION

The invention overcomes the prior art limitations by using randomly selected subsets of an ensemble of features to form tree inputs in generating different decision trees in a random decision-forest classifier. In accordance with the invention, the capacity of the classifier can be systematically expanded to increase accuracies in classifying both seen and unseen data. Specifically, in classifying an object represented by the ensemble of features, sample points are derived from randomly selected subsets of the features. Nonterminal nodes of each decision tree, in response to at least one of the sample points, jointly render a classification of the object. A discriminant process is used to combine the classifications from the trees to determine the class to which the object belongs.

When the invention is viewed from a mathematical perspective, the multiple decision trees in the random decision-forest classifier are generated in randomly selected subspaces of the feature space, defined by the ensemble of features. Trees in different subspaces generalize their classifications in a complementary manner, and the combined classification affords generalization accuracy which can be monotonically improved by adding trees to the classifier.

DETAILED DESCRIPTION

Figure 1:
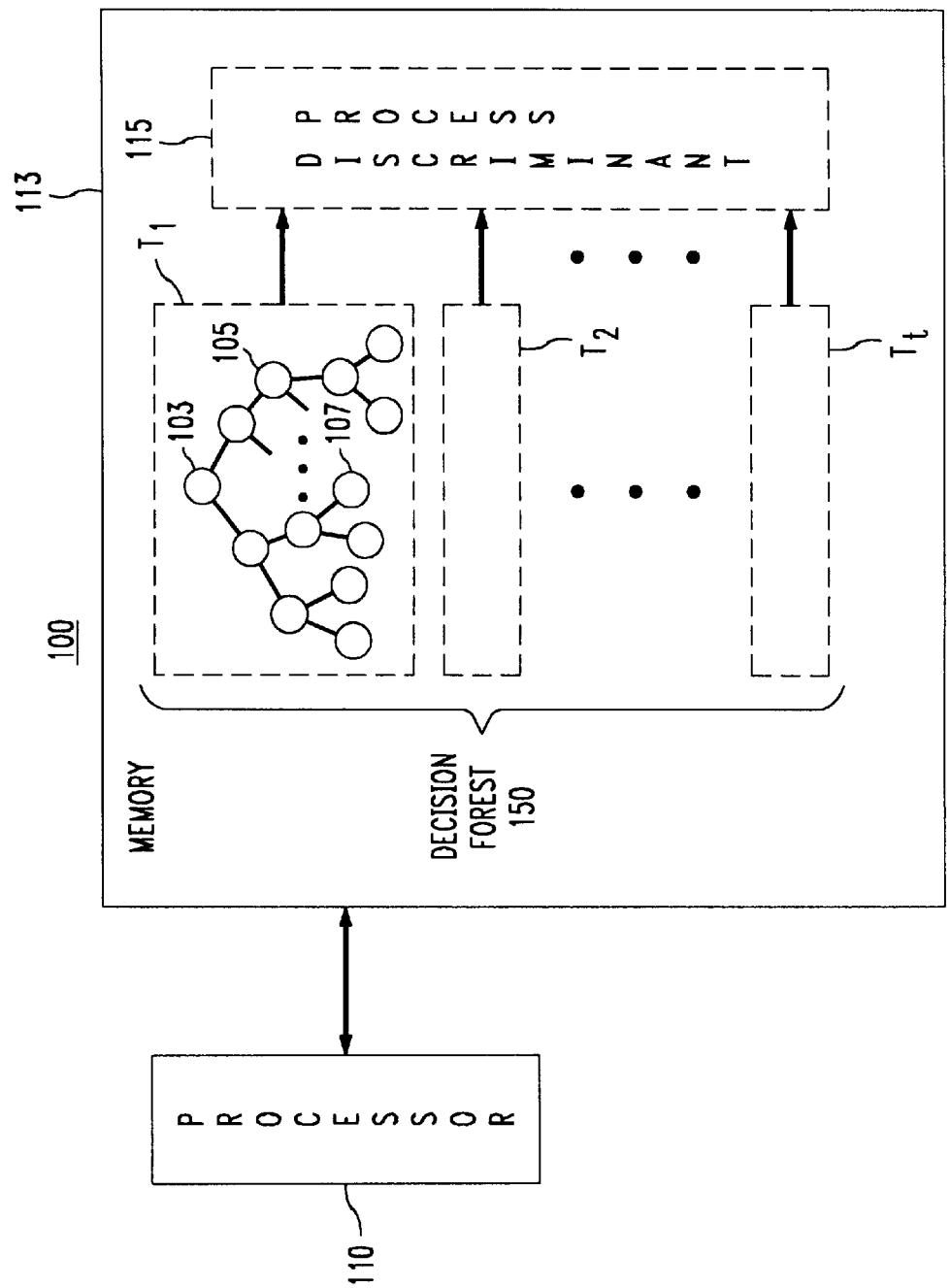
FIG. 1 is a block diagram of a decision-forest classifier in accordance with the invention.

FIG. 1 illustrates decision-forest classifier 100 embodying the principles of the invention. Classifier 100 may be used for classification or recognition of images such as handwritten characters. Classifier 100 is illustratively a conventional computer and includes processor 110 and memory 113. Memory 113 includes programs or instructions for directing processor 110 to carry out the inventive classifying process, graphically depicted as decision trees $T_1$ through $T_t$, connected by discriminant process 115, where t is a positive integer. Decision trees $T_1$-$T_t$ connected in this manner are herein referred to as "Decision Forest 150."

Although $T_1$-$T_t$ may be structurally different, without loss of generality, decision tree $T_1$ includes a multiplicity of nodes, such as nodes 103, 105 and 107, which are interconnected by paths. Node 103 is the "root" of $T_1$ where the input data enters. $T_1$ has a multiplicity of nonterminal nodes such as node 105. In this particular illustrative embodiment, each tree is a fully-split binary tree of the type of an oblique decision tree to be described. Like other binary trees in general, each nonterminal node of the tree has two paths each leading to another node down the tree. Each nonterminal node incorporates a decision rule whereby the node decides a particular one of the two paths through which the input data is transmitted to the succeeding node for further disposition thereof. Of course, root 103 of tree $T_1$ is also a nonterminal node. Each tree terminates on terminal nodes or leaves which indicate the class to which the input data belong. Node 107 is one such terminal node in tree $T_1$.

Figure 2:
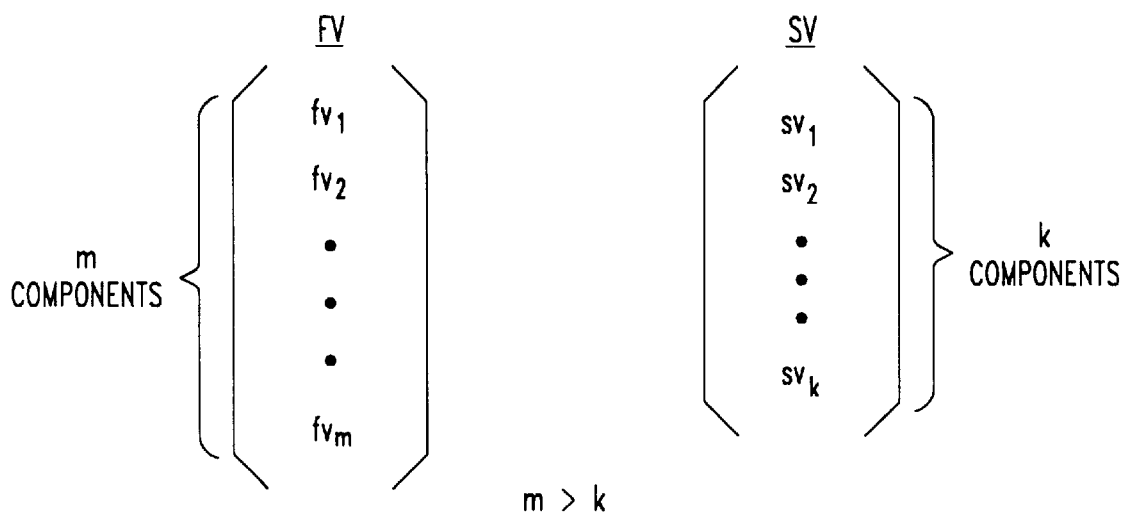
FIG. 2 illustrates a feature vector representing an image to be classified by the decision-forest classifier of FIG. 1, and a sample vector representing input data to the classifier.

In this illustrative embodiment, the image to be classified by decision-forest classifier 100 has m features. Referring to FIG. 2, this image is generically represented by feature vector FV having m components ($fv_1$ through $fv_m$), where m>0. In accordance with the invention, only a subset of the m components, or the derivatives thereof, form the sample data input to each tree in decision forest 150. The subset is randomly selected from the m components, and the size of the subset may vary from tree to tree. The sample data is generically represented by sample vector SV having k components ($sv_1$ through $sv_k$), where 0<k<m.

It should be pointed out at this juncture that, mathematically, SV can be visualized as a sample point in a k-dimensional subspace within an m-dimensional feature space defined by FV. In addition, the decision rule in each nonterminal node in a decision tree, say node 105, can be described as a hyperplane in the k-dimensional subspace. Depending on which side of the hyperplane the sample point is situated, the nonterminal node decides a particular one of the two paths through which the sample data is transmitted to the succeeding node in the tree.

Classifier 100 is initially trained using training data. As mentioned before, the general belief is that there is a tradeoff between the classification accuracy on the seen training data which varies directly with the complexity of the tree structure and the generalization accuracy on the unseen data which varies inversely with same. Traditional tree-growing techniques can be used to grow complex trees that can correctly classify the seen training data up to 100%. Yet because of the biases of the particular ways in which hyperplanes are chosen to divide multidimensional points representing the input samples, the generalization accuracy on unseen data is rarely as good. Resorting to non-fully split trees (i.e., trees that have been pruned back) would mean losing 100% accuracy on seen training data. Nor do they guarantee excellent generalization accuracy.

In accordance with the invention, a decision forest such as decision forest 150 comprising multiple trees is designed to overcome the generalization biases. The multiple trees are generated in randomly selected subspaces of the feature space. Trees in different subspaces generalize their classifications in a complementary manner, and the combined classification affords generalization accuracy which can be monotonically improved by adding trees to the forest.

Two major problems were solved in achieving the invention. The first problem was how to systematically generate multiple decision trees using the same set of training data of a limited quantity. The second problem was how to combine the classification outcomes by the individual trees to preserve their accuracies.

There are many ways to generate different trees. By arbitrarily injecting differences in construction of the trees, the resulting trees may yield different generalization accuracies, but do not necessarily maintain 100% accuracy on seen training data. For instance, constructing trees using different subsets of the training data does not guarantee 100% accuracy in classifying the full training data set.

I have recognized that randomization is a powerful tool for introducing differences in classifiers. In accordance with the invention, multiple trees are generated in randomly selected subspaces of the feature space. For the feature space of m dimensions, there are $2^m-2$ subspaces in which a decision tree can be generated. The use of randomization in selecting subsets of components of the feature vector (FV) to form the corresponding subspaces solves the first problem identified above.

A decision tree constructed in each selected subspace using the central axis projection or perceptron training technique described hereinbelow yields 100% correctness in classifying the training data points. Yet the classification is invariant for points that are different from the training data points only in the unselected dimensions. In this way each tree generalizes its classification to unseen data in a different way. The vast number of subspaces for high dimensional feature space (the number of dimensions m typically equal few hundreds in character recognition applications) provides more than sufficient choices for use in practice. Classification accuracy is related to the statistical properties of the discriminant function to be described, and it can be shown that very high classification accuracy can be achieved well before all the possible combinations are exhausted.

Figure 3:
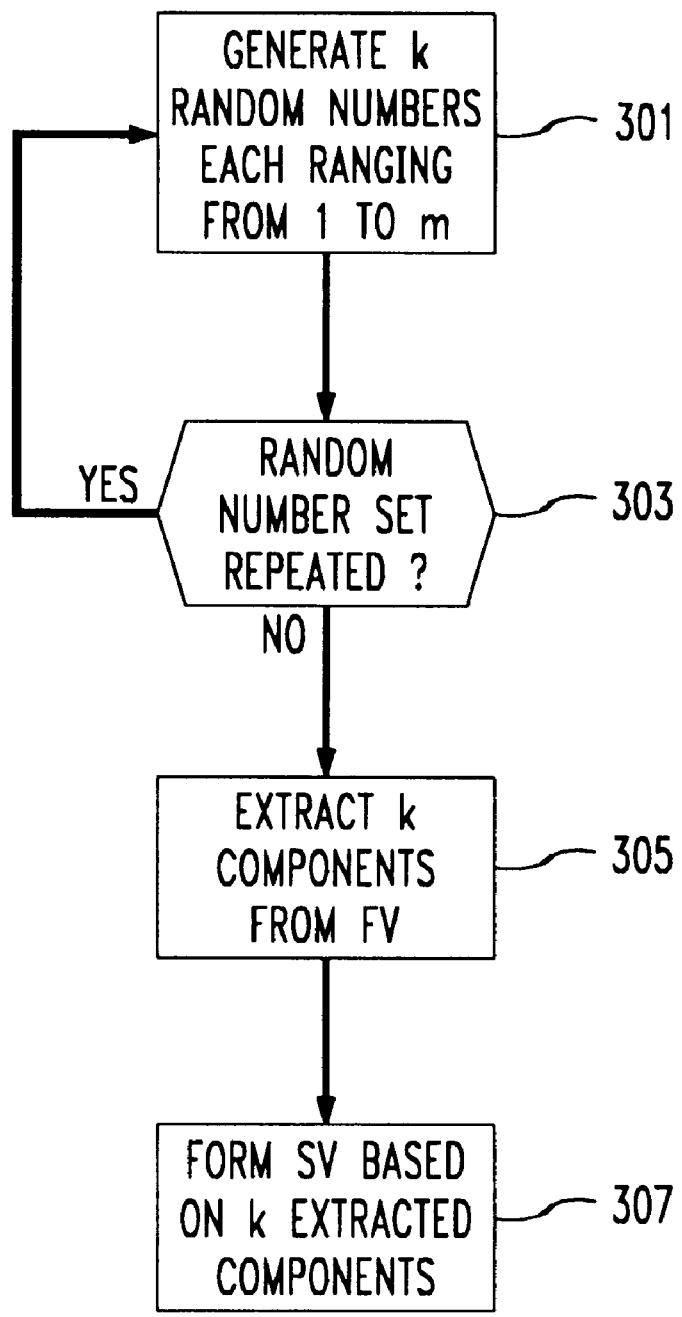
FIG. 3 is a flow chart illustrating the steps of forming the sample vector of FIG. 2.

In this particular illustrative embodiment, the sample points entering different trees in forest 150 have the same number of dimensions k, but each sample point corresponds to a different subset of k components of a training or unseen feature data point represented by FV of FIG. 2. To this end, for each tree of $T_1$-$T_t$, processor 110 is instructed to generate k random numbers, whose values are each greater than 0 but not greater than m, as indicated at step 301 in FIG. 3. At step 303, processor 101 checks for repetition of the set of the random numbers just generated. If the set of numbers was previously used for another tree, processor 101 regenerates another set until it is different from all the previous sets. Otherwise if the set of random numbers was not used before, processor 101 proceeds to step 305 where it extracts k components of FV corresponding to the values of the random numbers. For example, a random number having a value of 1 corresponds to $fv_1$, a random number having a value of 2 corresponds to $fv_2$, and so on and so forth. Processor 101 then forms at step 307 sample point SV of FIG. 2 by adopting the extracted k components, or the derivatives thereof, as $sv_1$ through $sv_k$, respectively.

The above-identified second problem of how to combine the classification outcomes of a sample point by the individual trees to yield an accurate classification will now be addressed. Specifically, this problem was solved by implementing discriminant process 115 of FIGS. 1 and 4.

For a sample point x, let $v_j(x)$ be the terminal node to which x is assigned when it descends tree $T_j$ (j=1, 2, . . . , t); let the posterior probability that x belongs to class c (c=1, 2, . . . , n) be denoted by $P(c|v_j(x))$, and $$P(c|v_j(x)) = \frac{P(c, v_j(x))}{\sum_{c=1}^{n} P(c, v_j(x))}.$$

Figure 4:
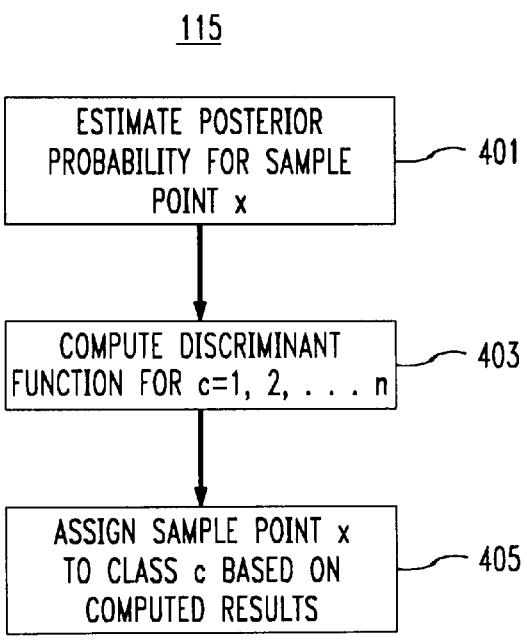
FIG. 4 is a flow chart illustrating the steps of a discriminating process within the classifier of FIG. 1.

This posterior probability is estimated by processor 101 as a ratio of the number of class c points to the number of all points that are assigned to $v_j(x)$, as indicated at step 401 in FIG. 4. It should be noted that in this illustrative embodiment, since the trees are fully split, most of the terminal nodes contain a single class (except for abnormal stops) and thus the value of the estimate $\hat{P}(c\ v|v_j(x))$ is almost always 1.

A discriminant function central to discriminant process 115 is defined as follows:

$$g_c(x) = \frac{1}{t} \sum_{j=1}^{t} \hat{P}(c|v_j(x)).$$

Processor 101 at step 403 computes $g_c(x)$ for c=1, 2, . . . n. At step 405, processor 101 assigns x to class c for which $g_c(x)$ is the maximum, thereby accomplishing the classification of the image in question.

The above discriminant function preserves 100% accuracy on the training points. For an unseen point, g(x) averages over the posterior probabilities that are conditioned on reaching a particular terminal node. Geometrically, each terminal node defines a neighborhood around the points assigned to that node in the chosen subspace. By averaging over the posterior probabilities in these neighborhoods (decision regions), the discriminant function approximates the posterior probability for a given x in the original feature space. It can be shown that the classification accuracy afforded by the discriminant function increases with the value of t.

As mentioned before, each decision tree in decision forest 150 is of the type of an oblique decision tree. The oblique decision tree is different from many other prior art binary trees. In the latter, the value of a feature component is typically examined at each nonterminal node. A test pattern is assigned to one branch of the tree according to the value of that feature component. Geometrically this corresponds to assigning the vector point to either of two sides of a hyperplane that is parallel to at least one axis of the feature space.

The oblique decision tree is more general in that the hyperplane associated with each nonterminal node is not necessarily parallel to any of the axes. The hyperplane is represented by a linear function of the components of the feature vector, where some coefficients may be zero. Oblique hyperplanes usually give a smaller tree that can fully split the data to leaves of a single class. The trees may have drastically different sizes depending on how the hyperplanes are selected.

Most techniques for constructing trees use a clustering algorithm that reveals certain clues about the distribution of data, followed by the selection of a hyperplane according to a criterion that best separates the distributions. One such technique involving use of Tomels links is described in: Park et al., "Automated Design of Linear Tree Classifiers," *Pattern Recognition,* 23, 12, 1990, pp. 1393–1412; another technique involving use of simulated annealing is described in: Heath et al., "Induction of Oblique Decision Trees," *Proceedings of the* 13*th International Joint Conference on Artificial Intelligence,* 2, Chambery, France, Aug. 28–Sep. 3, 1993, pp. 1002–1007.

Most of the sophistication in tree growing algorithms is intended to minimize the size of the trees, but there is little promise on the generalization accuracy. Two techniques for tree construction, neither of which involves any sophisticated optimization procedure are illustratively used here. In either technique the stopping rule is until all the terminal nodes contain points of a single class, or until it is impossible to split further. The latter occurs when identical samples exist across two or more classes, or due to limitations of the hyperplane search algorithm, e.g., a coarse quantization of the search space.

Central Axis Projection (CAP)

A first technique for tree construction, namely, the central axis projection (CAP) technique illustratively used here, aims at separating at least two classes at each nonterminal node. This technique calls for finding a splitting hyperplane among those that are perpendicular to a line connecting the centroids of two classes that are farthest apart.

Specifically, at any nonterminal node including the root, assume that training points of n classes are present, the two classes whose means are farthest apart by Euclidean distance are first identified. The sample means of these two classes are then connected by a straight line (conveniently referred to as a "central axis"), and all the data points are projected onto this line. The line segments between the two means is traversed in steps at a predetermined step size, and an error function is evaluated for each hyperplane passing through an end of a step and perpendicular to the central axis. For each class, the error function counts the number of points that are not on the side of the hyperplane where the majority of the points of that class fall. The hyperplane that minimizes the sum of these counts is chosen for that node.

Perceptron Training (PERCEPT)

A second technique for tree construction illustratively used here, namely, the perceptron training (PERCEPT) technique, relies on a fixed-increment perceptron training algorithm to choose a hyperplane at each nonterminal node. Details on such an algorithm is described in: N. Nilsson, "Learning Machines: Foundations of Trainable Pattern-Classifying Systems," McGraw-Hill, New York, 1965.

In accordance with the perceptron training algorithm, at each nonterminal node, the two classes that are farthest apart are identified and their means are chosen as anchor points, as in the case of CAP. Two sets, S1 and S2, are initiated each containing one of these two classes. The other classes are then assigned to either S1 or S2 depending on which anchor point is closer in Euclidean distance to their means. A hyperplane for separating S1 and S2 is then sought to minimize the number of points on the wrong side of the hyperplane.

The perceptron training algorithm terminates when the error count of the misplaced points decreases to zero. However, since there is no test on the linear separability of S1 and S2, there is no guarantee that the error count would ever decrease to zero. Therefore, this algorithm is also forced to terminate after a fixed number of iterations. In the case that the perceptron thus obtained does not separate points of any class from the rest, the process continues by switching to CAP.

Although the formation of the two sets is somewhat arbitrary, the iterative optimization does lead to a substantial reduction of tree sizes. Training is more expensive using PERCEPT, but the smaller trees take less storage and are faster for classifying new samples.

Experiments with Handwritten Digits

The invention was experimentally applied to solve a difficult recognition problem—the recognition of isolated handwritten digits. One of the experimental findings is that the inventive technique is most effective to solve problems involving high dimensional data. Problems involving no more than 26 classes were successfully tackled with the inventive technique when binary trees were used. It should be noted that use of binary trees is, however, not a requirement of the invention.

In particular, experiments were performed on handwritten digits of 10 classes. The images are from NIST (National Institute of Standards and Technology) Special Database 3 as well as from the 1992 NIST Competition. The training and testing sets from the 1992 NIST Competition are mixed, and from the mixed set 60,000 samples are drawn to form training set TR, and 10,000 samples are drawn to form test set TE. The images are binary and normalized to a size of 20×20 pixels. There are roughly the same number of samples in each class in both the training and testing sets. As a matter of fact, the data used in the instant experiments are the same as those used in several other studies reported in: L. Bottou et al., "Comparison of Classifier Methods: A Case Study in Handwritten Digit Recognition," *Proceedings of the 12th International Conference on Pattern Recognition,* II, Jerusalem, Israel, Oct. 9–13, 1994, pp. 77–82 (except that grayscale values are thresholded to binary), and details on the data construction are given in that report.

To investigate the performance of the classifier without any heuristics about the data, raw pixel maps of the binary, normalized images were used as input feature vectors each having 20×20=400 elements. These vectors are conveniently referred to as the "Pixel Vectors (f1)" and in the form of FV of FIG. 2, with m=400. To see how simple knowledge of the domain can help, another feature vector was constructed by exploring the neighbor relationships of the pixels. These features are derived from those used in constructing quadratic polynomial discriminants described in: J. Schuermann, "A Multifont Word Recognition System for Postal Address Reading," *IEEE Transactions on Computers,* C-27, Aug. 8, 1978, pp. 721–732. They are conjunctions and disjunctions of neighboring pixels in various directions. For a given pixel I(i,j) at row i and column j, the following features were taken:

$H(i, j) = I(i, j) \wedge I(i, j+2)$ horizontal neighbor;

$V(i, j) = I(i, j) \wedge I(i+2, j)$ vertical neighbor;

$N(i, j) = I(i, j) \wedge I(i+2, j+2)$ NW-SE diagonal neighbor; and $S(i, j) = I(i, j) \wedge I(i+2, j-2)$ SW-NE diagonal neighbor;

-continued and $H'(i, j) = H(i, j) \vee H(i+1, j) \vee H(i+2, j) \vee H(i+3, j);$ $V'(i, j) = V(i, j) \vee V(i, j+1) \vee V(i, j+2) \vee V(i, j+3);$ $N'(i, j) = N(i, j) \vee N(i+1, j-1) \vee V(i+2, j-2) \vee V(i+3, j-3);$ and $S'(i, j) = S(i, j) \vee S(i+1, j+1) \vee S(i+2, j+2) \vee S(i+3, j+3),$ where "$\wedge$" denotes the binary "AND" operator and "$\vee$" denotes the binary "OR" operator. A second vector f2 is formed by concatenating f1 with the above-defined values H' (i,j), V' (i,j), N' (i,j) and S' (i,j) for each (i,j). For an image of 20×20 pixels, f2 has 852 components. Thus, in this instance FV=f2, with m=852.

The findings from the above experiments confirm that with a prior art single tree based classifier, an increase in the classifier complexity invariably leads to overtraining, thereby sacrificing the generalization accuracy. By contrast, with the decision forest classifier in accordance with the invention, an increase in the classifier complexity in achieving perfect accuracy on training data does not lead to a compromise in the generalization accuracy. Rather, the generalization accuracy improves as the inventive classifier incorporates additional trees.

The foregoing merely illustrates the principles of the invention. It will thus be appreciated that those skilled in the art will be able to devise numerous other arrangements which embody the principles of the invention and are thus within its spirit and scope.

For example, each tree in decision forest 150 is illustratively generated in a random subspace of the same number of dimensions. However, in accordance with the invention, the number of dimensions of the random subspaces need not be the same.

Furthermore, the choice of the subspace need not be the same for all nonterminal nodes of a tree in decision forest 150. That is, although the input to each tree in decision forest 150 is disclosed to be a randomly selected subset of the components of a feature vector, the invention should not be limited by such an illustrative example. In fact, the inventive notion encompasses that each nonterminal node of a tree in decision forest 150 examines a randomly selected subset of feature components which may be different from the subset examined at the root of the tree. This idea can be easily implemented by inputting to the tree the whole ensemble of the feature components, rather than a subset thereof. At each nonterminal node including the root, depending on which components are randomly selected, the input is masked so that only the selected components are made available to the node.

In addition, in the illustrative embodiment, the trees in decision forest 150 are binary trees. However, it will be appreciated that the present invention can also be implemented with non-binary trees.

Finally, although the invention is disclosed herein using the central axis projection and perceptron training techniques for construction of trees, the scope of the invention is not constrained by use of any of such particular techniques. Rather, it will be appreciated that other tree-construction techniques may be used to implement the invention.

I claim:

1. Apparatus for assigning an image to a selected one of a plurality of classes comprising:
   a generator for generating a plurality of features based on the values of a plurality of pixels representing said image;

a first processor for randomly selecting subsets of features from said plurality of features, and for providing a plurality of sample points, each sample point corresponding to a different one of said subsets of features;

a plurality of decision-tree classifiers each including a plurality of nonterminal nodes, the nonterminal nodes of each decision-tree classifier, in response to at least one of said sample points, jointly rendering a classification of said image; and a second processor for combining the rendered classifications from said plurality of decision-tree classifiers to determine said selected class to which said image is assigned.

2. The apparatus of claim 4 wherein each feature is a function of the values of selected ones of said plurality of pixels.

3. The apparatus of claim 2 wherein the selected pixels are neighbors to one another.

4. A method for use in an apparatus comprising a plurality of decision-tree classifiers to assign an image to a selected one of a plurality of classes, each classifier including a plurality of nonterminal nodes, comprising the steps of:

generating a plurality of features based on the values of a plurality of pixels representing said image;

randomly selecting subsets of features from said plurality of features;

providing a plurality of sample points, each sample point corresponding to a different one of said subsets of features;

jointly rendering by the nonterminal nodes of each decision-tree classifier a classification of said image in response to at least one of said sample points; and combining the rendered classifications from said plurality of decision-tree classifiers to determine said selected class to which said image is assigned.

5. The method of claim 4 wherein each feature is a function of the values of selected ones of said plurality of pixels.

6. The method of claim 5 wherein the selected pixels are neighbors to one another.

7. Apparatus for assigning an image to a selected one of a plurality of classes comprising:

means for generating a plurality of features based on the values of a plurality of pixels representing said image;

means for randomly selecting subsets of features from said plurality of features;

means for providing a plurality of sample points, each sample point corresponding to a different one of said subsets of features;

a plurality of decision-tree classifiers each including a plurality of nonterminal nodes, the nonterminal nodes of each decision-tree classifier, in response to at least one of said sample points, jointly rendering a classification of said image; and means for combining the rendered classifications from said plurality of decision-tree classifiers to determine said selected class to which said image is assigned.

8. The apparatus of claim 1 wherein the first processor includes the plurality of decision-tree classifiers, the generator and the second processor.

* * * * *